US006298275B1

(12) United States Patent
Herman, Jr.

(10) Patent No.: US 6,298,275 B1
(45) Date of Patent: Oct. 2, 2001

(54) NON-INTRUSIVE PART IDENTIFICATION SYSTEM FOR PARTS CUT FROM A SHEET MATERIAL

(75) Inventor: James S. Herman, Jr., Marblehead, MA (US)

(73) Assignee: Gerber Garment Technology, Inc., Tolland, CT (US)

( * ) Notice: Subject to any disclaimer, the term of this patent is extended or adjusted under 35 U.S.C. 154(b) by 0 days.

(21) Appl. No.: 08/409,188

(22) Filed: Mar. 23, 1995

(51) Int. Cl.[7] .............................. G06F 19/00; G06K 9/36

(52) U.S. Cl. ............................ 700/130; 700/59; 700/185; 700/219; 382/111

(58) Field of Search .................................... 364/468, 469, 364/470, 474.22, 474.08, 474.25; 382/8, 48, 61, 111, 141, 152, 209; 210/121.67, 121.68, 121.82; 700/57–59, 100–102, 115–116, 122–125, 127–130, 134–135, 143, 166–167, 183, 185, 219, 221, 223–227; 219/121.67, 121.68, 121.82

(56) References Cited

U.S. PATENT DOCUMENTS 3,603,581 * 9/1971 Christal ................................ 269/307
3,604,701 9/1971 Hawley .
3,752,471 8/1973 Hawley .
3,761,675 9/1973 Mason et al. .
3,765,349 10/1973 Gerber .
3,781,531 12/1973 Baker .
3,803,960 4/1974 Pearl et al. .
3,805,650 4/1974 Pearl .
3,855,887 12/1974 Pearl et al. .
3,864,997 2/1975 Pearl et al. .
3,875,389 4/1975 McFadden et al. .
3,887,903 6/1975 Martell .
3,895,358 7/1975 Pearl .
4,024,545 * 5/1977 Dowling et al. ..................... 347/259
4,328,726 5/1982 Pearl .
4,469,553 * 9/1984 Whitehead ............................ 216/60
4,583,181 4/1986 Gerber et al. .
4,685,054 8/1987 Manninen et al. .
4,901,359 2/1990 Bruder .
4,961,149 10/1990 Schneider et al. .
5,058,174 * 10/1991 Carroll ................................ 382/111
5,092,829 3/1992 Gerber .
5,114,128 5/1992 Harris, Jr. et al. .
5,141,572 * 8/1992 Gerber .................................. 156/64
5,172,326 * 12/1992 Campbell, Jr. et al. ............. 700/134
5,230,764 7/1993 Moll .
5,230,765 7/1993 Weiselfish et al. .
5,258,917 11/1993 Bruder et al. .
5,333,111 * 7/1994 Chaiken et al. ..................... 700/135
5,353,355 * 10/1994 Takagi et al. ........................ 382/111
5,487,011 * 1/1996 Chaiken .............................. 700/135
5,537,946 * 7/1996 Sadeh et al. .................... 112/475.03
5,653,900 * 8/1997 Clement et al. ................ 219/121.68

* cited by examiner

*Primary Examiner*—William Grant
*Assistant Examiner*—Paul Rodriguez
(74) *Attorney, Agent, or Firm*—Brian B. Shaw, Esq.; Stephen B. Salai, Esq.; Harter, Secrest & Emery LLP

(57) ABSTRACT

A part identification system for non-intrusively identifying a subset of parts cut from a sheet material. The part identification system includes a visual signal generator for projecting an identifying image associated with a given subset of cut parts. A labelling program accesses a database, generates a control signal including the part location and identifying image and sends the signal to a controller. The controller directs the identifying image from the visual signal generator to identify the cut parts.

21 Claims, 4 Drawing Sheets

NON-INTRUSIVE PART IDENTIFICATION SYSTEM FOR PARTS CUT FROM A SHEET MATERIAL

FIELD OF THE INVENTION

The present invention relates to handling a plurality of parts cut from a sheet material, and more particularly, to the identification and grouping of parts cut from the sheet material for subsequent handling and processing.

BACKGROUND OF THE INVENTION

In the cutting of sheet material, particularly limp sheet material such as cloth or leather in an automated cutting system, it customary to generate a marker which indicates the shapes and arrangements of parts to be cut from a section of the sheet material. The marker is often generated by a computer program and displayed on a monitor for operator modification or adjustment prior to cutting the sheet. The information in the marker is then used to create a set of instructions usable by a cutting system. Once the parts are cut from the sheet material, the parts must be removed and presented for subsequent processing.

To identify the cut pieces for subsequent handling and/or assembly, the prior art has employed labelers for affixing labels to the sheet material such as shown by U.S. Pat. Nos. 4,028,167; 4,189,377; and 4,514,246. More recently, U.S. Pat. Nos. 5,141,572 and 5,092,829 disclose labelling and bundling mechanisms.

Alternatively, as shown in U.S. Pat. No. 3,895,358 a paper plot of the part peripheries is printed on plotter paper and the paper is placed on the fabric before cutting. The top layer of the paper remains attached to the parts so that the operator can identify and pass the parts to a corresponding subsequent process.

While the prior systems identify the cut parts, the systems are relatively complicated and require a substantial investment in hardware or materials. In addition, for those subsequent processes where members of a specific subset have been placed in a common area and further identification of the individual members of the subset is unnecessary, the prior labelling methods are redundant, or provide excessive labelling.

Therefore, the need exists for a method and apparatus of non-intrusively and temporarily identifying cut parts while in their cut position on a sheet material as well as their association with a specific subset for subsequent handling or processing. The need further exists for identifying the cut parts that are members of a particular subset, wherein the subset members may be located in different sheets or sections of the sheet. The need also exists for identifying the cut parts to provide a sorting which expedites downstream processing.

SUMMARY OF THE INVENTION

The part identification system of the present invention provides a method and apparatus for non-intrusively and temporarily identifying a subset of cut parts in a sheet material for subsequent processing or handling. The part identification system cooperates with a known cutting assembly, a marker database and a label for the cut parts, and includes a visual signal generator for projecting an identifying image along an optical path; a controller for directing the optical path and a labelling program for accessing the database and the labels to generate a control signal for the controller to direct the identifying image to identify the subset of parts.

It is contemplated that the visual signal generator may be one of a coherent or incoherent light source and the identifying image may be an alphanumeric character, a specified design, geometry, color or portion of the cut part periphery. Further, the identifying image may include a light line extending from the cut part to a location remote from the sheet material.

The visual signal generator cooperates with controller, including a shutter to selectively preclude and permit transmission of light, an XY scanner and amplifier for controlling the direction of the image and a scanner driver for driving the scanner.

The part identification system further includes a labelling program which reads the database to locate the labels of the parts cut from the sheet material. The labelling program selects the subset members from the labels, performs the necessary calculations, creates the identifying image and generates a control signal for the controller.

The present system also includes an operator input connected to the controller for allowing the operator to designate certain parameters, such as a specific identifying images as well as the subsets to be identified. The present system may also include a voice activation control for permitting hands free operator input.

The present system is compatible with fixed bed and conveyor type cutting assemblies so that the projection of the identifying image remains in a desired spatial relation with the corresponding part independent of relative motion between the cut part and the projection system.

Further, the labelling program allows the display of the identifying images to be sequenced so that cut parts may be removed in a particular order, thereby alleviating downstream sorting processes. The labelling program also forms an identifying image that may include a preferred orientation of the cut part.

The part identification system may cooperate with a label printer, whereby the labels are affixed to the parts, or carriers for a subset of the cut parts. Also, the present system may interface with a unit production system for substantially automating the transformation of sheet material to sorted cut parts.

The present method for temporarily identifying a part cut from a sheet material includes providing a database including the location of the cut part and a label having an association of the part with a subset; generating a control signal representing the identifying image and part location; and projecting an identifying image corresponding to the cut part along an optical path.

The method may further include projecting an identifying image including one of an alphanumeric character, a specific design, color, or portion of the part periphery, wherein the identifying image may include a light line connecting the cut part and the location remote from the sheet.

The present method includes selecting a region of the sheet from which parts are cut, upon which the identifying image may be displayed and selecting an order of subsets to be identified, as well as projecting a preferred orientation of the cut part.

The method further includes adjusting the projection of the identifying image to accommodate relative motion of the cut part. It is further contemplated the method may include printing a label for identifying the cut part or carrier for the cut part, wherein the label may include shipping information. The method also includes interfacing with a unit production system for integrating cut part location and transport.

DETAILED DESCRIPTION OF THE PREFERRED EMBODIMENT

Figure 1:
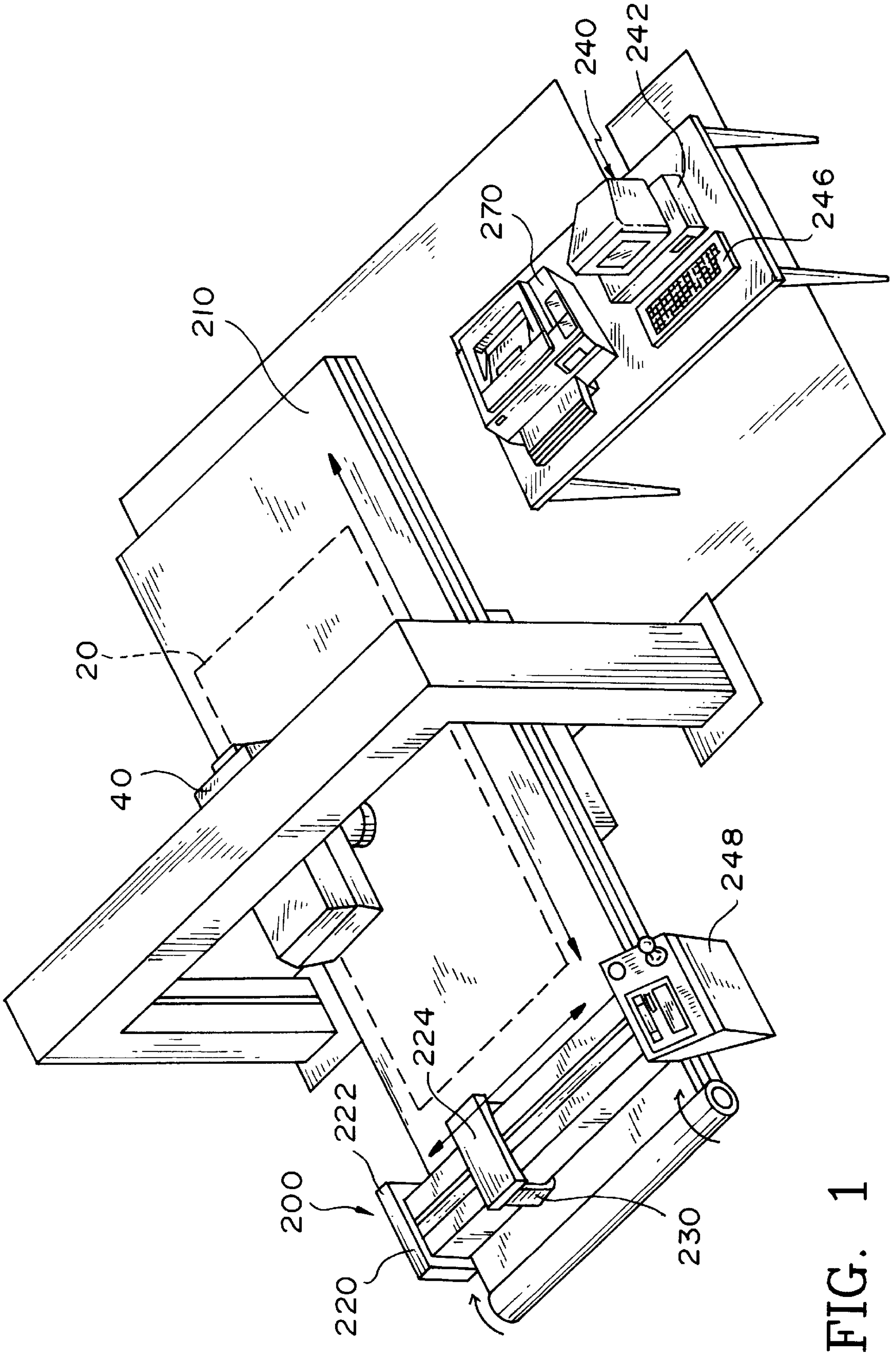
FIG. 1 is a perspective view of a cutting system employing the part identification system.
Figure 2:
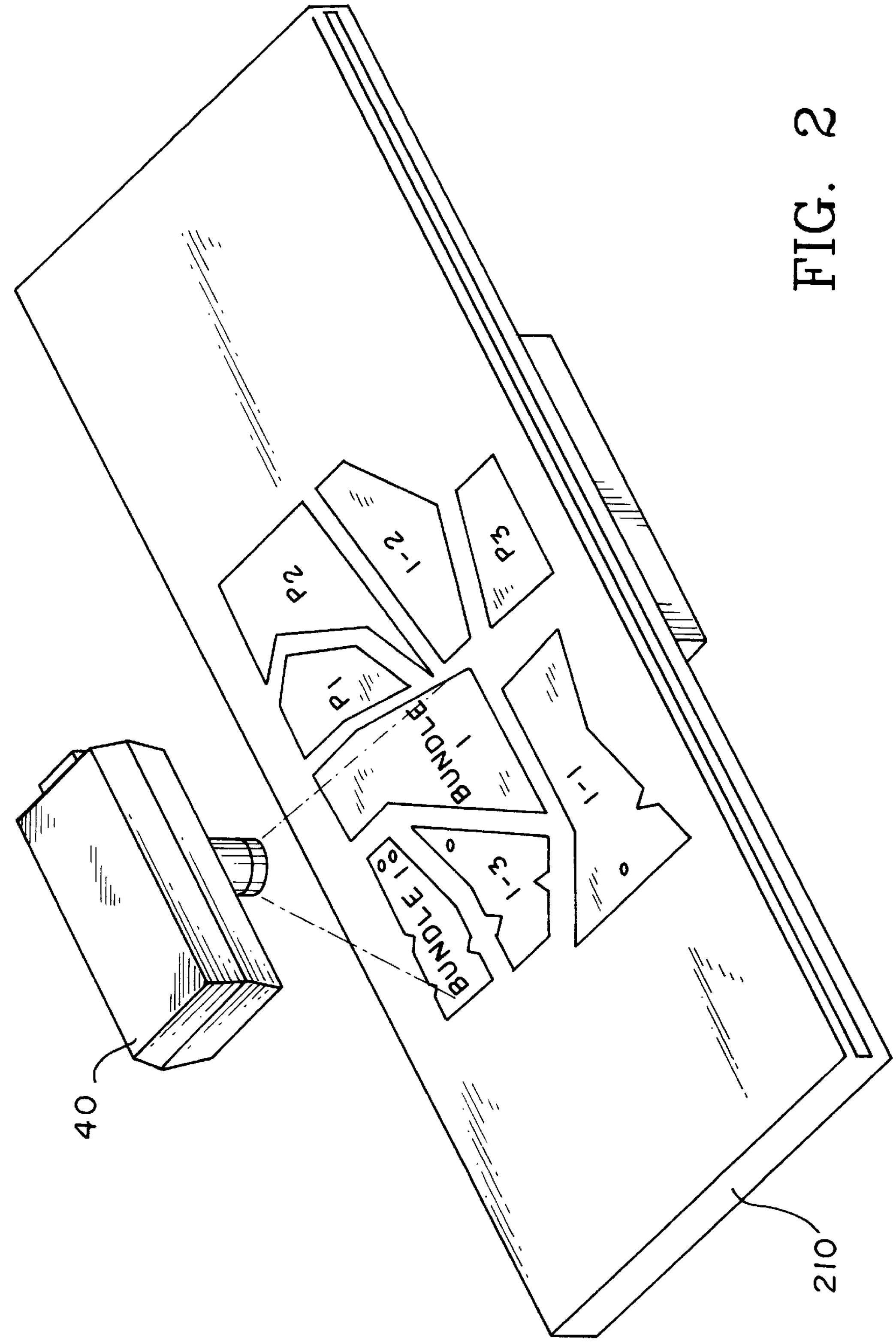
FIG. 2 is a perspective view showing the projection of an identifying image on a subset of parts cut from a sheet material.
Figure 3:
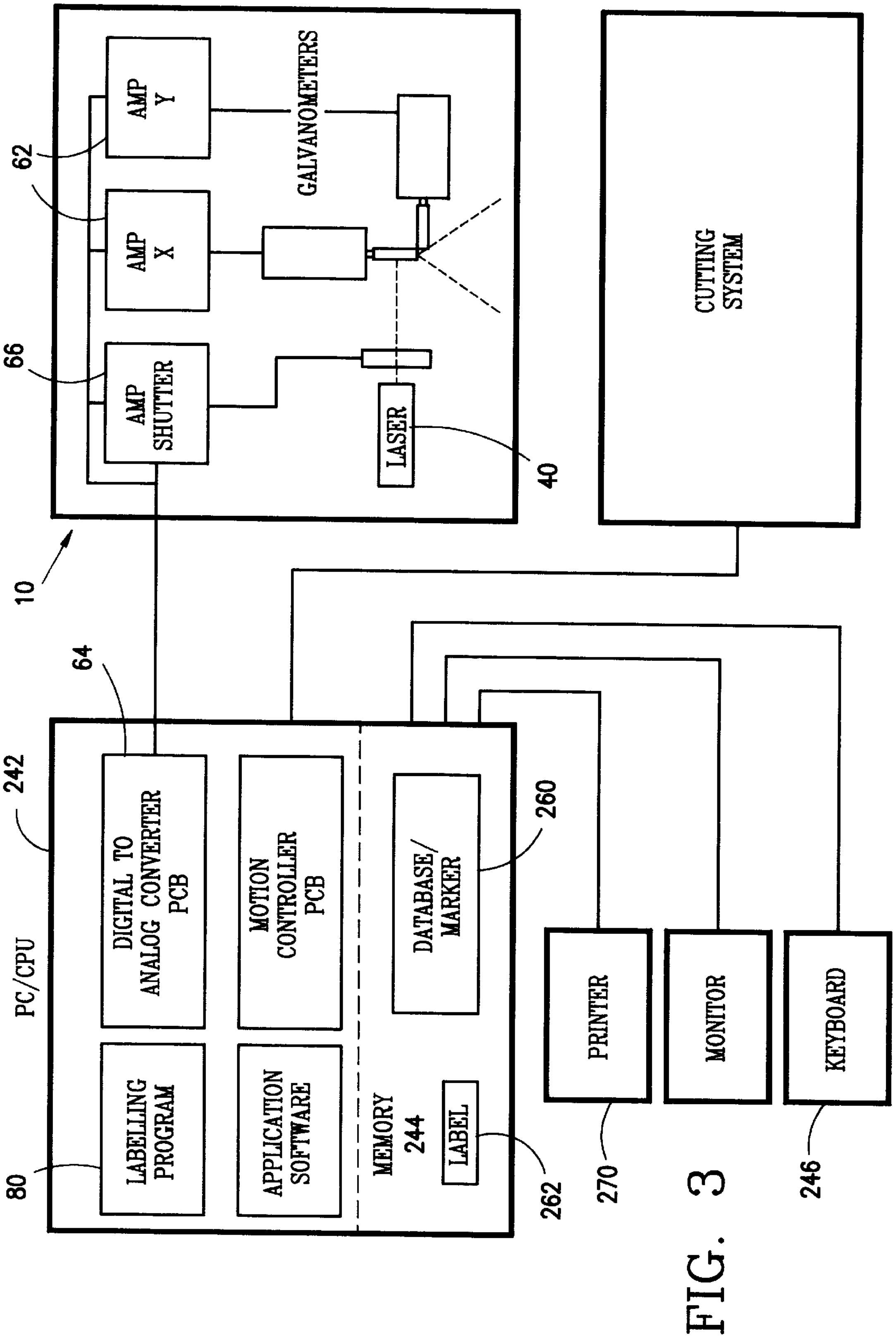
FIG. 3 is a schematic view of the operable connection of the part identification system.
Figure 4:
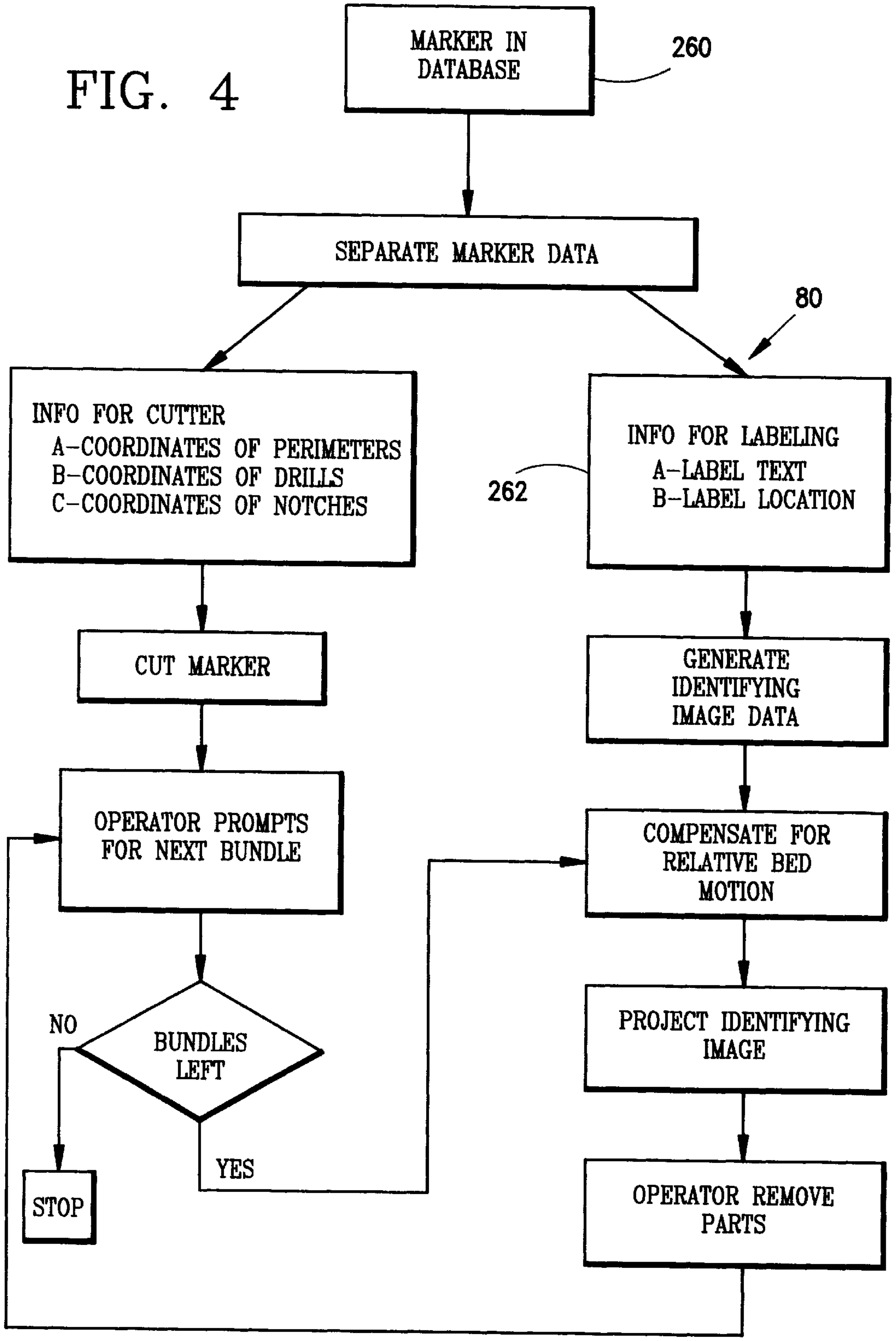
FIG. 4 is a flow chart of the operations of the labelling program.

The part identification system 10 of the present invention cooperates with a cutting assembly 200 and an associated marker database 260. As the part identification system 10 and method may be used with a variety of cutting assemblies, only a single cutting assembly 200 is set forth in detail.

Cutting Assembly

The cutting assembly 200 cooperates with the database 260 to cut a plurality of parts $P_1$, $P_2$, $P_3$ . . . from a sheet material 20. The cutting assembly 200 includes a support surface 210, a cutter assembly 220 and a cutter controller 240.

The support surface 210 may be any of a variety of structures without departing from the broader aspects of the invention. Preferably, it is a penetrable bed formed by a continuous bristle blocks or mats, or by a contiguous blocks of foam material. If desired, one or more vacuum chambers can be provided beneath the penetrable bed. Air passages extend through the bed so that the lay up can be compressed and firmly held against the support surface during the cutting operation.

The support surface 210 is sufficiently long to accommodate a number of spread sheets 20. Typically, the support surface 210 may have a length of 50 feet or more. Alternatively, the support surface 210 may be a conveyor which transports sections of the sheet material 20 past a number of stations.

The cutter assembly 220 includes a gantry 222 movable relative to the support surface 210 along the length of the support surface in an X direction. The gantry 222 carries a Y-carriage 224 movable perpendicular to the length of the support surface 210. The Y-carriage 224 carries a cutter 230, such as a circular blade, reciprocating knife, laser or water jet.

The cutter controller 240 controls the cutter assembly 220 as well as movement of the cutter 230. The cutter controller 240 includes a computer 242 such as an IBM compatible PC that accesses the database. The cutter controller 240 includes or has access to a memory 244 for storing the database 260. Operator input to the computer 242 is accomplished through standard input devices 246 including a keyboard or remote pointing device, such as a mouse/track ball. The remote pointing device may include a plurality of buttons as well as the track ball for moving a pointer or indicator. In addition, some systems may include voice activation through the program "Listen for Windows" from Verbex. The cutter controller 240 also includes a motion controller 248, such as a DMC-600 from Galil for effecting motion of the gantry 222, y-carriage 224 and the cutter 230. Industry available software is employed to effect motion of the cutter 230 along a path in response to the database 260.

The cutting assembly 200 may also include a scanner or digitizer for inputting the periphery of the sheet material 20. The scanner or digitizer may also be employed to enter the desired part peripheries.

A marker which includes the cutting instructions is formed and stored in the database 260. The marker is generated by any of a variety of commercial programs from Gerber, Lectra or Polygon.

It is understood that those skilled in the art may employ software to directly control the gantry 222, cutter 230, conveyor (if used), all critical input and output such as an emergency stop and cutter termination and other safety related functions, if present, using an operating system in the cutter controller 240. Alternatively, a commercially available Computer Numerical Control (CNC) controller may be provided between peripheral devices such as the scanners and digitizers and the work station to directly control the devices. CNC controllers are widely available from many suppliers such as Model 8400 marketed by Alan Bradley (Cleveland, Ohio).

The Database

The database 260 includes the periphery of the parts $P_1$, $P_2$, $P_3$ . . . , the location of the parts with respect to the sheet material 20 and/or the support surface 210, as well as notch and drill information. That is, the database 260 includes the marker. Preferred orientation of the cut parts or sequencing instructions may also be included in the database 260 as well as any grade requirements for the sheet 20 from which the part is to be cut. The database 260 may also include grouping of certain parts within a specific subset of parts that are cut, or to the be cut from the sheet material 20.

For example, if parts $P_1$, $P_2$, $P_3$ to be cut are for three different size garments, the database 260 would include an association or link between each part and a given garment size with which the part must be grouped or bundled for subsequent processing. Alternatively, if each of the parts $P_1$, $P_2$, $P_3$ is used in a common garment, there may be associations of specific parts for different stages of the subsequent processing within the garment. That is, $P_1$ may be first attached to $P_2$ and subsequently to $P_3$. That is, the database 260 may include an ordering or sequencing of the parts within a subset. In addition, if the cut part $P_1$ has a preferred orientation for subsequent processing, the database 260 may include such designation.

The database 260 is generated from a variety of inputs including the digitizer/scanner 226, operator input, part design parameters and nesting programs. The information of the database 260 is accessible to the part identification system 10. It is understood the database 260 may be a single database or a plurality of limited databases or files. Alternatively, the database 260 may be formed of a number of files linked or connected, wherein the files are accessed by the part identification system 10.

The database 260 also includes a label 262 for each part $P_1$, $P_2$, $P_3$. The label 262 includes at least an association of the part with a given subset or subsequent process. The term "label" refers to the information which relates a given part to a subset (or subsequent process) but is not physically (materially) linked or connected to the actual part. That is, the label 262 is remote from the corresponding part $P_1$. The label 262 may include further information such as a specific customer (if subsets of parts cut from the sheet material 20 are to be presented to different customers) as well as shipping information.

It is further understood the label 262 may include subsequent processing information such as preferred orientation or ordering within the subset. As this information can be separately generated from the cutting instructions of the marker, the label 262 may be in a separate file from the marker. While this information can be within the label 262 in its file, the label 262 may alternatively be stored within the database 260.

Part Identification System

The part identification system 10 includes a visual signal generator 40, a controller 60 for directing the visual signal generator and a labelling program 80 for accessing the labels 262 and generating a control signal which includes the information to be projected.

The visual signal generator 40 projects an identifying image along an optical path. The visual signal generator 40 may be either a coherent or incoherent light source. The control and accuracy of a coherent source renders lasers a preferred source. The coherent source is a commercially available helium-neon laser. The visual signal generator 40 is located above the support surface 210, and depending upon the specific structure of the cutter assembly 220 may be affixed relative to the support surface. That is, a projection path is orthogonal to support surface 210 for some locations and oblique with respect to remaining portions.

The controller 60 includes an XY scanner 62 for directing the optical path from the visual signal generator 40. The scanner 62 is manufactured by General Scanning, Inc. The controller 60 may also include a control card 64 for insertion into the computer 242 to generate an analog signal for driving the XY scanner 62. The control card 64 is commercially available through Metrabyte and converts a digital signal into an analog signal. The controller 60 includes a shutter 66 for selectively permitting and precluding passage of the identifying image.

The labelling program 80 resides in the computer 242. However, it is understood the labelling program 80 may run in its own computer. The labelling program 80 accesses the database 260 to obtain the available information about a given cut part $P_1$. Specifically, the labelling program 80 locates the labels 262 for the parts cut from the sheet material 20. The labelling program 80 also obtains other subsequent processing information such as preferred orientation and customer identification or shipping instructions. If the label 262 is separately located from the marker database 260, the labelling program 80 must read both the marker database 260 and the label file to locate a link between the two and obtain the necessary information from each source. The labelling program 80 then groups the members of any subsets represented in the sheet material 20. The subset members are linked to a subset identifying image by the labelling program 80 for inclusion in a control signal.

The labelling program 80 may present a preliminary display either on the cut parts or a CRT, wherein the operator may adjust the parameters of the control signal. The operator may select only portions of the sheet 20 for part identification. Alternatively, an ordering of subset identification may be created. That is, if three subsets are cut from the sheet material, the operator (or labelling program 80) may select the order in which the subsets are identified. It is understood the identifying image for a given subset may include an order of removal indication with respect to another identifying image. For example, if members of two different subsets are simultaneously identified by their corresponding identifying images, the identifying image of the subset to be removed first may be a different size or color, which is recognized by the operator as an indication of ordering.

As the database 260 includes the part location either in terms of the sheet material 20, the support surface 210 or an absolute position, the labelling program 80 selects, or is directed to this information and uses the information in creating the control signal. The control signal associates a given cut part as a member of a given subset, and includes a subset specific indicia or identifying image. The image may be a specific color, dot, arrow, shape, alphanumeric character, part name or even just an outline or portion of an outline of the cut part, or other identifying images or identification. The control signal may also include such indications as orientation preferences. The control signal is sent through the control card 64 which converts the digital signal into an analog voltage for driving the scanner 62 and the visual signal generator 40. The subset specific indicia (identifying image) is then projected upon those cut parts and preferably within the periphery of the parts, if size permits.

It is understood that the identifying image may be shown adjacent to the part or the sheet material 20. That is, the identifying image need only be projected with respect to the cut part to be identified so that an operator may discriminate between the desired cut part and other cut parts. Similarly, the identification of the members of a subset distinguish the subset members from other subsets. The identification does not need to include what the particular parts are, or how they will be subsequently processed, but rather allows an operator to visually scan the sheet material 20 and readily identify which cut parts to remove and group together.

As more information is included in the identifying image, the operator is able to determine any ordering of parts within the subset, or ordering of subsets, as well as preferred orientations of the parts. That is, the identifying image may include an ordering or sequencing of the parts within a given subset. The ordering within the subset may be accomplished by including an indication of an adjacent part or a sequence position in the identifying image of a given part. Specifically, if a subset identifying image is the number 1, the identifying image for the first part in the subset may be 1—1 and the identifying image for the second part in the first subset may be 1–2, and so on.

Such ordering or sequencing in the identifying image allows the operator to place members of a subset in a given order within the subset, thereby removing downstream ordering steps and expediting the downstream processes. Therefore, when the operator removes the members of the subset in response to the identifying image, the operator can readily order (sort) the members within the subset, thereby removing this task from the downstream process.

As the database 260 includes part location and size, the labelling program 80 may offset or displace the specific subset identifying image from the actual part location. That is, depending upon the number of cut parts to the identified, the labelling program 80 may direct the image to the outside of the periphery of the cut part or even the sheet 20. In this situation, the desired part may lie within the sheet 20 as the only part that is adjacent the edge of the sheet. Further, the labelling program 80 accepts signals from the cutting assembly 200 that represent relative motion of the cut parts, and adjusts the scanner 62 so that the identifying image tracks any such relative motion.

Alternatively, the labelling program 80 may employ different images for different subsets in response to the size of the subset members. That is, for larger subset members, the image may be a part name or subset name and smaller members may be identified by a certain color or image geometry.

The part identification system 10 may also print to a printer 270 for forming subset or carrier labels or even shipping labels. The printer 270 may be any commercially available laser, ink jet or dot matrix printer.

OPERATION

In operation, the database 260 is at least partially generated by the cutting assembly 200 and stored in the memory 244 to be accessed by the computer 242 and the labelling program 80. The labelling program 80 accesses the database 260 to obtain the specific part location relative to at least one of the location of the sheet 20, the support surface 210 or an absolute position. The labelling program 80 also locates the association of the cut part with a given subsequent process or subset, as set forth in the label 262. The labelling program 80 accepts operator input to identify only certain members of a subset or a certain portion of the sheet material 20. The labelling program 80 generates the control signal which includes the members of a given subset and transmits the control signal to the controller 60. The controller 60 then directs the visual signal generator 40 to project the specific identifying image corresponding to the parts cut from the sheet material 20.

A handler then collects the identified cut parts from the sheet 20 and places them in a common area or station. The identified subset of parts may be placed in a carrier 30 for transport to a subsequent processing station, wherein all the parts can be identified as members of a single subset. To obviate the prior need for the generation and attachment of a label to each part, the part identification system 10 prints a single tag on printer 270 to identify the carrier or collectively identify all the parts of the subset.

As the visual signal generator 40 employing a laser has a resolution quicker than the persistence of the human eye, all the parts within a given subset may be substantially simultaneously identified, as well as members of different subsets by different images.

Further, if the desired resulting location of a given subset of parts is spaced apart from the support surface 210, the labelling program 80 may generate a control signal which creates a visual path such a light line to the spaced apart station, as well as the part identification image. The handler then takes a cut part from the sheet and follows the projected light line to deposit the part at the spaced apart station.

The part identification system 10 thereby non-intrusively identifies parts cuts from the sheet material. That is, the present system 10 does not require affixing a physical tag, or label to the parts, either adhesively or with pins. In addition, as physical tags are generated only on an as needed basis to identify the weeded and grouped members of a subset, printing costs are reduced.

Further, as the label 262 for a part may be independently generated from the cutting instructions of the maker, the present system 10 can optimize the parameters of subsequent processing and handling to identify the cut parts in a particular order, independent of cutting considerations. That is, by operably combining the stored label information 262 with the marker database 260 and projecting a corresponding image, the present system 10 improves efficiency and reduces costs.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed:

1. A part identification system for temporarily identifying parts cut from a sheet material, comprising:

(a) a visual signal generator for projecting a subset identifying image onto a portion of the sheet material;

(b) a label for each part cut from the sheet material, the label including an association of the cut part with a given subset of parts; and (c) a labeling program for accessing the labels, grouping members of the given subset and directing the subset identifying image to identify members of the given subset in the cut sheet material.

2. The part identification system of claim 1, wherein the subset identifying image is one of an alphanumeric character, a specific design, a geometry, a color and a portion of a part periphery.

3. The part identification system of claim 1, wherein the subset identifying image is a projected light line extending from the cut part to a remote location.

4. The part identification system of claim 1, further comprising an operator input for adjusting the projection of the identifying image.

5. The part identification system of claim 1, wherein the identifying image includes a preferred orientation of the cut part.

6. The part identification system of claim 1, further comprising a label printer connected to the labelling program for printing a physical tag identifying the cut part.

7. The part identification system of claim 1, wherein the label is stored in a database.

8. The part identification system of claim 1, wherein the identifying image includes a sequencing indication for the removal of the cut parts from the sheet material in a given order.

9. The part identification system of claim 1, wherein the labeling program links members of the given subset to the subset identifying image for inclusion in a control signal, and the part identification system further comprises a controller which accepts the control signal and directs the visual signal generator.

10. A method of identifying parts cut from a sheet material on a support surface, comprising:

(a) reading an association of a plurality of parts and associated subsets; and (b) projecting a subset identifying image onto one of the cut part, the sheet material and the support surface to identify members of a given subset.

11. The method of claim 10, wherein reading the association includes accessing a database having a label for each part, the label including the association of a part and a given subset.

12. The method of claim 10, further comprising projecting one of an alphanumeric character specific design, color and portion of a part periphery as the identifying image.

13. The method of claim 10, further comprising projecting a projected light line extending from the cut part to a spaced apart location as the identifying image.

14. The method of claim 10, further comprising accepting an operator input to adjust the projection of the subset identifying image.

15. The method of claim 10, further comprising projecting a preferred orientation of the cut part.

16. The method of claim 10, further comprising creating a physical tag for identifying and accompanying a cut part.

17. The method of claim 10, further comprising projecting a sequencing image for the removal of the cut parts from the sheet material in a given order.

18. The method of claim 8 further comprising the step of cutting parts from the sheet material prior to the step of projecting the subset identifying image.

19. A method of non intrusively identifying a subset of parts cut from a sheet material, comprising:

(a) accessing a database of part locations and an association of the parts with respective subsets to generate a control signal; and (b) projecting a subset specific identifying image in response to the control signal onto one of the cut parts, the sheet material and a support surface to identify the members of the subset.

20. A part identification system for sequencing the removal of parts cut from a sheet material, comprising:

(a) a visual signal generator for projecting an image onto one of the cut parts, the sheet material and a support surface;

(b) a label for each part cut from the sheet material, the label including a sequencing of the cut parts for a subsequent process; and (c) a labeling program for accessing the labels, sequencing the cut parts and directing the image to identify the cut parts according to the sequencing for removal from the sheet material.

21. A method of sequencing the removal of parts cut from a sheet material disposed upon a support surface, comprising:

(a) reading a sequencing for the parts cut from the sheet material; and (b) projecting an image on to one of the cut parts, the support surface and the sheet material to identify the sequence for the removal of the cut parts.

* * * * *